Nov. 2, 1965            O. R. HARVEY            3,215,900

FLUID MONITORING SYSTEM

Filed Aug. 25, 1961            4 Sheets-Sheet 3

INVENTOR:
Oral Richard Harvey,
BY
Bair, Freeman and Molinare
ATTORNEYS.

Nov. 2, 1965 O. R. HARVEY 3,215,900
FLUID MONITORING SYSTEM
Filed Aug. 25, 1961 4 Sheets-Sheet 4

INVENTOR:
Oral Richard Harvey,
BY
Baer, Freeman and Molinare
ATTORNEYS.

United States Patent Office 3,215,900
Patented Nov. 2, 1965

3,215,900
FLUID MONITORING SYSTEM
Oral Richard Harvey, Marshalltown, Iowa, assignor to Fisher Governor Company, a corporation of Iowa
Filed Aug. 25, 1961, Ser. No. 133,916
7 Claims. (Cl. 317—123)

This invention relates generally to fluid monitoring apparatus and more particularly to new and improved fluid monitoring apparatus of the type having advantageous use in monitoring basic sediment and water in the processing of crude oil.

The present invention was developed to fill the need of the oil industry for precise and dependable monitoring equipment, such as that used for measuring the basic sediment and water content in crude oil, sometimes referred to as B.S. and W. monitoring. However, those skilled in the art will appreciate that the invention can be used with equally advantageous results in detecting component changes in a great number of types of fluids other than oil.

However, for purposes of illustration and of simplifying the explanation of the invention, it will be described hereinbelow in the embodiment adapted for crude oil monitoring. As such, the invention basically comprises a sensor and transmitter assembly and a diverting controller. The sensor measures the dielectric constant of crude oil as it comes from treaters or separators. When water is present in the crude oil, the dielectric constant of the fluid mixture is higher than it would be for crude oil alone. An increase in the dielectric constant causes the transmitter to send a higher current signal to the diverter controller. In accordance with the operation of the invention, if this transmitter signal exceeds a preset value selected for the diverter, a switch is actuated so that a diverting valve can reroute the crude oil back to storage tanks or the treater for further processing.

Accordingly, it is a general object of this invention to provide a new and improved fluid monitoring apparatus.

It is a more particular object of this invention to provide such an improved fluid monitoring apparatus which is particularly adapted for B.S. and W. monitoring applications.

It is another object of this invention to provide a new and improved sensor for fluid monitoring apparatus which comprises a ceramic tube coaxially positioned within a capacitor plate pipe such that the fluid flows in the annular space therebetween and never reaches the other capacitor plate at the inside of the ceramic tube, thereby eliminating wax and other obstacles to the fluid flow which could be the source of gassing, blind spots, or shorting that adversely affect the sensitivity and accuracy of measurement.

It is still another object of this invention to provide a new and improved sensor, as above, which includes a temperature compensator assembly on the inside of the ceramic tube to automatically compensate for temperature variations in the crude oil, such temperature compensation being effected by the rise and fall of a mercury column to provide the sensor with a varying capacitance to offset the increase or decrease in the dielectric constant or capacitance of the oil.

It is a further object of this invention to provide a new and improved transmitter for fluid monitoring apparatus which is positioned within an explosion and weatherproof housing adapted to be fastened directly to the sensor so as to eliminate coaxial cabling and the temperature compensation problems often associated with such cabling.

It is a still further object of this invention to provide a highly advantageous transmitter circuit for a fluid monitoring transmitter which is completely transistorized and thermostatically controlled to eliminate the effect of temperature ambients on the accuracy of the monitoring function.

It is still another object of this invention to provide a new and improved transmitter circuit, as above, which utilizes a variable frequency oscillator whose frequency of operation is determined by the sensor. This circuit is an improvement over the conventional bridge approach in that it is more economical and more accurate in detecting small capacitance changes than all but the most critically designed bridge circuits.

It is a still further object of this invention to provide a new and improved transmitter for fluid monitoring apparatus which is characterized by a calibrating network permanently attached to the inside of the instrument housing and accessible from the outside, either directly or through a small access cap, so that calibration can be checked without removing the main instrument cover.

It is still another object of this invention to provide a diverter controller for fluid monitoring apparatus which comprises adjustable means for causing a controller relay to be actuated at a predetermined excess B.S. and W. level between prescribed limits and further comprises a settable time delay circuit, for delaying the fluid diverting function a desired time delay period after an excess B.S. and W. level has been detected.

It is still another object of this invention to provide new, improved and highly advantageous fluid flow monitoring apparatus characterized by its high degree of accuracy, reliability and flexibility.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

Figures 1, 2, 3:
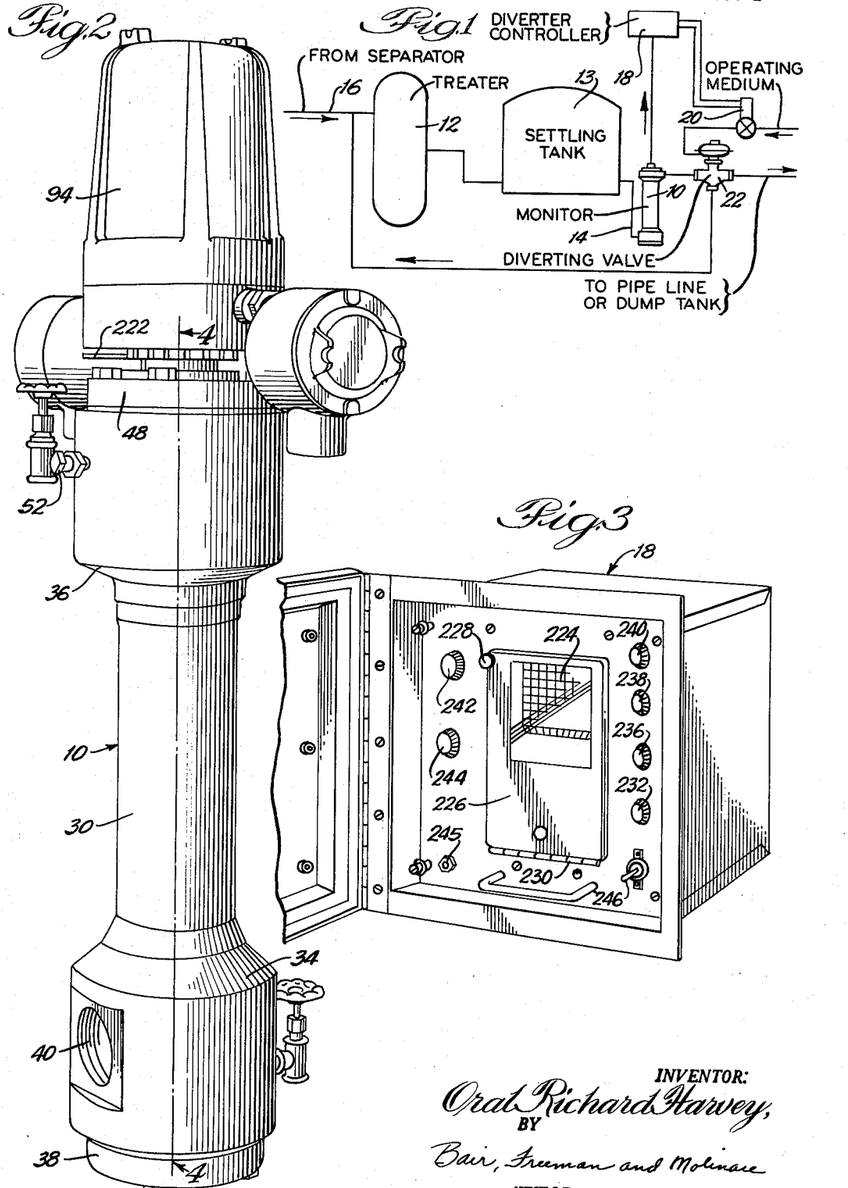
FIGURE 1 is a schematic diagram illustrating the invention in a typical installation for monitoring crude oil.
FIGURE 2 is a perspective view showing the exterior of one illustrative embodiment of sensor and transmitter assembly in accordance with the invention.
FIGURE 3 is a perspective view of the exterior of an illustrative embodiment of a diverter controller in accordance with the invention.

Referring now to the drawing, and more particularly to FIGURE 1 thereof, the invention is illustrated as forming a part of a typical installation of the type used in the oil industry for monitoring basic sediment and water contamination in crude oil. As there shown, the installation comprises a monitoring device 10 which, in accordance with the features of this invention, would normally comprise a sensor and transmitter assembly. The sensor measures the dielectric constant of crude oil as it is fed through the fluid line 14 from a treater 12 and settling tank 13 or from a separator by means of the fluid line 16. If water is present in the crude oil, the dielectric constant of the crude oil will rise in proportion to the water contamination. This increase in dielectric constant of the crude oil is sensed by the sensor and causes the transmitter in the monitor 10 to send a current signal to the diverter controller 18, which also forms a part of the present invention. If this current signal from the transmitter to the diverter controller exceeds a preset value, indicative of an excessive amount of water contamination in the crude oil, the diverter controller actuates a solenoid valve 20 so that a diverting valve 22 can reroute the crude oil back to the treater or to storage tanks by means of the fluid flow line 24. Thus, the processing of the crude oil in being fed to either a pipe line or dump tank when the contamination does not exceed a predetermined level, or in being rerouted back to the treater or storage tanks when the contamination does exceed a predetermined level, is controlled by the sensor and transmitter assembly of monitor 10 in combination with the diverter controller 18.

The manner in which the above operation takes place will be explained in detail hereinbelow in connection with the accompanying drawings. Since the invention monitor utilizes the principle of capacitance measurement, a brief explanation of such capacitance measurement will clarify the description of the operation. As is well known to those skilled in the art, capacitance is a measure of the ability of a capacitor to store a charge, and a capacitor generally consists of two conducting plates separated by a non-conducting material called a dielectric. The amount of capacitance depends on three factors: The plate area, the spacing between the plates, and the dielectric constant of the material between the plates. When the dimensions of the capacitor do not change, i.e., when the plate area and spacing between the plates is constant, then the capacity is directly proportional to the dielectric constant of the capacitor dielectric material.

It is known that all fluids do not have the same dielectric constant. If the fluid is made to flow between two spaced capacitor plates, the dielectric constant, and therefore the capacitance of the capacitor, will be directly dependent upon the nature of the fluid. Crude oil is generally recognized as having a dielectric constant of about 2.0 to 2.3, and water has a dielectric constant of about 80. Thus, with water content in crude oil, the dielectric constant of the fluid mixture will be greater than that for crude oil alone. It will be appreciated by those skilled in the art that the relationship between the percent of water contamination in crude oil to the dielectric constant of the fluid is pratcically linear up to 5 percent of contamination.

Figures 4, 5, 6:
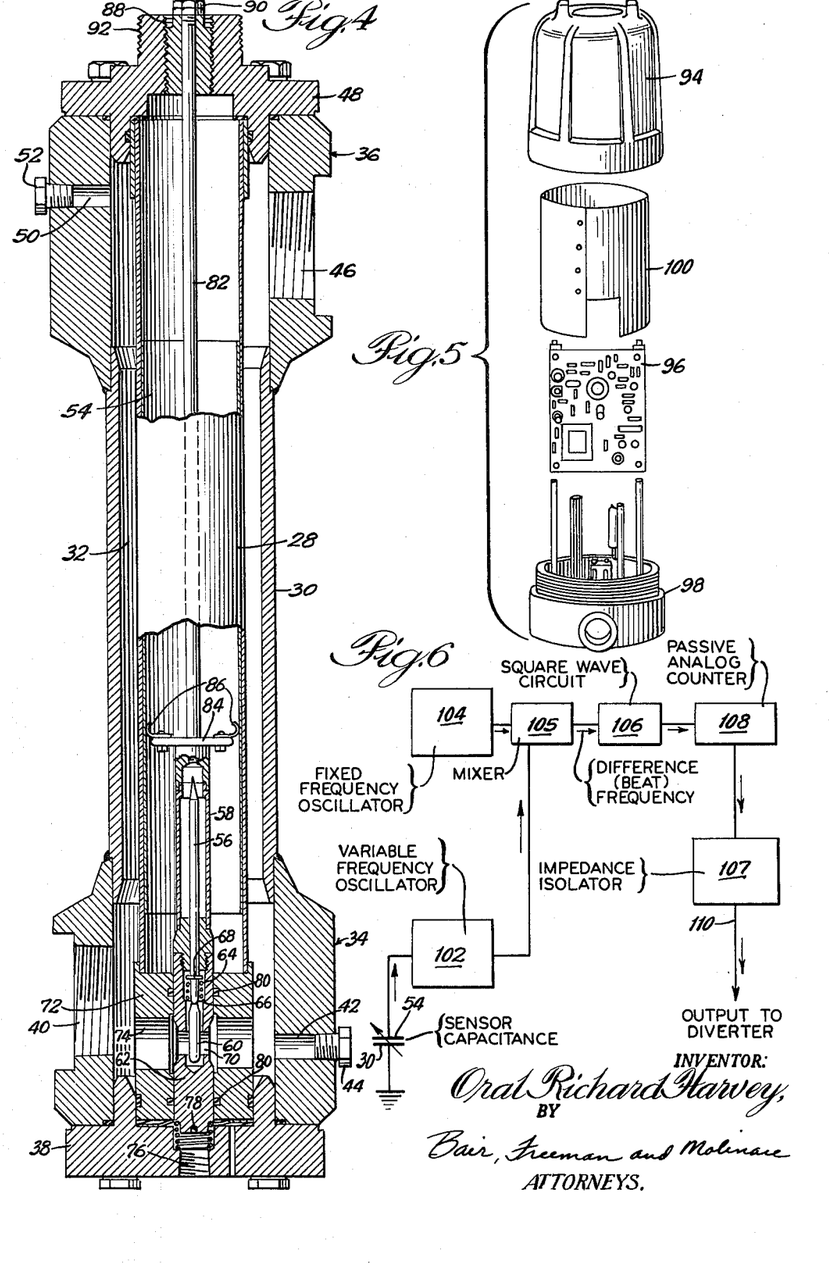
FIGURE 4 is an elevational view, in cross-section, of the sensor shown in FIGURE 2.
FIGURE 5 is an exploded view of the transmitter assembly shown in FIGURE 2.
FIGURE 6 is a block diagram of the transmitter circuit embodying the present invention.

One illustrative embodiment of monitor sensor which accurately measures the dielectric constant of the fluid is shown in FIGURES 2 and 4 of the drawing. In this particular embodiment of the invention, the monitor sensor comprises an elongated tube 28 of non-conducting material, such as Pyrex, pyroceram or the like positioned within a metallic pipe 30. The sensor tube 28 is formed with a smaller outer diameter than the inner diameter of the pipe 30 so as to define an annular fluid flow space 32 therebetween. In the operation of the invention, the fluid mixture of crude oil and water flows in the annular space 32 between the sensor tube 28 and pipe 30 so as never to be in contact with the interior of the sensor tube 28.

The fluid path is further defined by a lower collar 34 secured to one end of pipe 30 and an upper collar 36 secured to the other end of pipe 30. The lower collar 34 is engaged by a lower flange cap 38 and is formed with a relatively large fluid inlet opening 40 which is internally threaded for connection to a suitable fluid supply pipe. A drain vent 42 having a removable vent plug 44 also may be formed in the lower collar 34 to permit venting of the sensor when desired.

The upper collar 36 is engaged by an upper flange cap 48 and is formed with a relatively large fluid outlet opening 46 which is internally threaded to receive a suitable fluid outlet pipe. The upper collar 36 also may be provided with a suitable relief vent 50 having a plug 52 removably fastened thereto.

In accordance with an important feature of this sensor embodiment, the capacitor of the sensor is formed by the outer metallic pipe 30 which comprises the ground capacitor plate and an elongated metallic tube or coating 54 on the inner surface of the sensor tube 28 which comprises the hot capacitor plate of the sensing circuit.

It will now be appreciated that the novel construction of the sensor eliminates many of the trouble spots which are inherent in prior art sensors. Thus, there are no projecting webs or obstacles to the fluid flow within the sensor which could create gassing or blind spots. In the operation of the invention, this means that the buildup of wax is reduced and the effect of varying flow velocity is negligible. Wax could possibly from around the inlet 40 or the outlet 46 of the sensor, but since the measuring section defined by the capacitor plates is located midway in the pipe 30, this foreign material cannot affect the sensitivity or accuracy of the measuring section. In addition, the sensor tube 28 forms an insulator between the inner and outer capacitor plates so that slugs of water, welding slag and conductive deposits are unable to short out the measuring capacitor.

Those skilled in the art will appreciate that temperature changes may affect the dielectric constant of the fluid and, as such, any temperature changes could result in an erroneous measurement. This particular illustrative embodiment of the sensor is provided with a temperature compensator assembly to automatically compensate for temperature variations in the fluid. Towards this end, a coaxial parallel capacitor is provided inside of the sensor tube 28 and the inner metallic tube or coating 54.

As particularly shown in FIGURE 4 of the drawing, the temperature compensator assembly comprises a mercury thermometer 56 mounted inside of a coaxial shield 58 and having mercury bulb 60 formed therewith. The mercury thermometer and bulb are supported in a compensator body 62, as by means of a resilient spring 64 which is positioned between an annular shoulder 66 in body 62 and an annular flange 68 around thermometer 56 to properly position the bulb in the flow stream of the fluid at a bore 70 extending through the compensator body 62. The compensator body 62 is rotatably positioned in a support block 72 fitted between the lower flange cap 38 and the sensor tube 28.

The support block 72 is formed with an enlarged central bore 74 extending therethrough to enable the fluid entering the monitor at fluid inlet 40 to pass therethrough, and thus, to pass through the compensator body bore 70 for fully immersing the mercury bulb 60 in the flow stream. As the mercury within the thermometer 56 rises and falls in proportion to the temperature of the fluid, the compensator assembly gives the sensor a varying capacitance to off-set the increase or decrease in the dielectric constant or capacitance of the fluid due to temperature changes.

The sensor requires only one adjustment which advantageously may be set at the factory for typical crude oil and generally need not require field adjustment. It will be appreciated that the amount of temperature compensation afforded by the compensator can be varied by adjusting the window area surrounding the mercury thermometer. Thus, in accordance with a feature of this invention, this adjustment may be effected by removing a pipe plug normally secured to the internally threaded opening 76 of the lower flange cap 38 and turning the compensator element body 62 with a screw driver fitted within the slot 78 of the body 62. The rotation of the compensator element body 62 adjusts the window area or opening at the mercury bulb to provide the necessary adjustment. As shown in FIGURE 4, suitable sealing rings may be provided, as at 80, to prevent the fluid from entering into the area within the sensor tube 28.

Electrical connection is made to the hot capacitor plate 54 by means of an elongated conducting rod 82 supported on the compensator assembly, as at disc 84, and in contacting engagement with the metal tube or coating 54 by means of the sensor contacts 86. The conducting rod 82 is supported at its upper end by a mounting block 88 threadedly fastened to the upper flange cap 48 and held thereon by means of suitable screw fasteners 90. The threaded fasteners 90 and the portion of the conducting rod 82 which extends above the support block 88 form a pilot electrode contact which is adapted for connection to the transmitter circuit when the transmitter is mounted on the upper flange cap 48.

Advantageously, the upper flange cap 48 is provided with an externally threaded hub 92 to facilitate the mounting of the transmitter, the latter being internally threaded so as to be screwed directly on the sensor tube without requiring any coaxial cable connectors therebetween. Those skilled in the art will appreciate that the elimination of coaxial cable connectors between the sensor and transmitter serves to eliminate a possible trouble source in that temperature compensation for the various lengths of coaxial cable is not needed in the invention.

Figures 9, 10, 11:
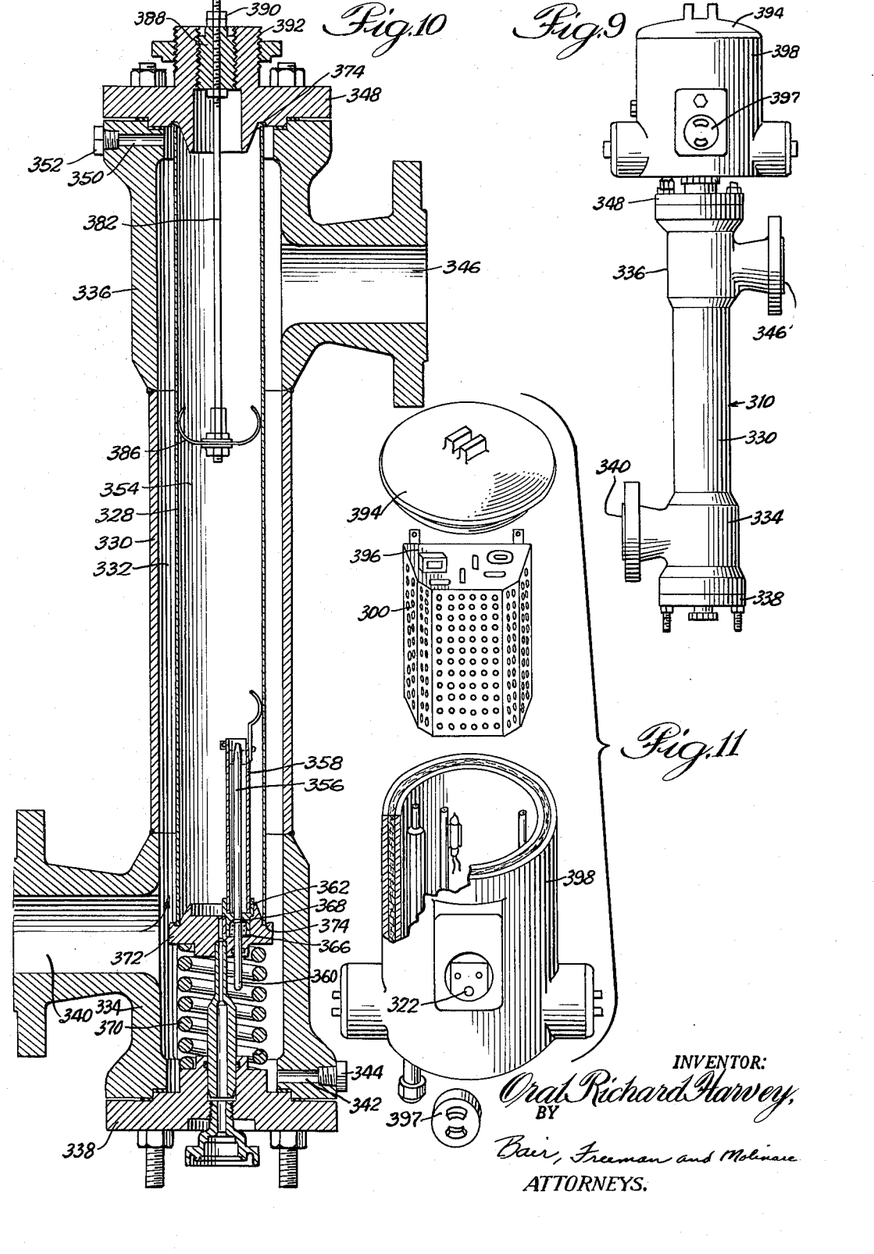
FIGURE 9 is an elevational view, in generally schematic form, of an alternative embodiment of sensor and transmitter assembly.
FIGURE 10 is an elevational view, in cross-section of the alternative sensor embodiment shown in FIGURE 9.
FIGURE 11 is an exploded view of the transmitter assembly generally shown in FIGURE 9.

Another alternative embodiment of a monitor sensor assembly is illustratively shown in FIGURES 9 through 11 of the drawing. This alternative monitor sensor assembly, like that shown in FIGURES 2, 4, and 5, finds advantageous use in the crude oil monitoring installation of FIGURE 1 although it will be appreciated that this monitor sensor assembly is well adapted for detection of component changes in a great number of types of fluids.

Referring specifically to FIGURES 9, 10 and 11, it can be seen that the alternative monitor sensor assembly is similar in many respects and in basic principles to the sensor monitor assembly of FIGURES 2, 4, and 5. Thus, the sensor assembly 310 comprises an elongated tube 328 of non-conducting material, such as Pyrex, positioned within a metallic pipe 330 so as to define an annular fluid flow space 332 therebetween.

The fluid flow path is further defined by the end member 334 sealed to the lower end of pipe 330 and the end member 336 sealed to the upper end of pipe 330. End member 334 is adapted to be closed by a lower flange cap 338 and is formed with a relatively large fluid inlet opening 340 which is flanged for connection to a suitable fluid supply pipe. The end member 334 also is provided with a drain vent 342 having a removable vent plug 344.

End member 336 is adapted to be closed by an upper flange cap 348 and is formed with a relatively large fluid outlet opening 346 which is flanged for connection to a suitable fluid outlet pipe. End member 336 also is provided with a relief vent 350 having a plug 352 removably fastened thereto.

It will now be appreciated that the capacitor of this sensor embodiment is formed by the outer metallic pipe 330 which comprises the ground capacitor plate and a metallic member within sensor tube 328 which advantageously may be a bonded metallic coating 354 on the inner surface of sensor tube 328 comprising the hot capacitor plate of the sensor circuit.

Electrical connection is made to the metallic coating 354 by means of a conducting rod 382 in contacting engagement with the coating 354 by means of the sensor contacts 386. Conducting rod 382 is rigidly and centrally maintained within the sensor tube by the nut fasteners 390 and the mounting block 388 threadedly positioned within the hub 392 of the upper flange cap 348. The hub 392 is externally threaded to facilitate the direct mounting of the transmitter housing on the sensor without the need for connecting coaxial cables therebetween. When the transmitter housing is so mounted, the upper end of conducting rod 382 forms a pilot electrode contact which connects to the variable oscillator of the transmitter circuit.

If desired, the sensor may be provided with temperature compensation, as described hereinabove, by the utilization of mercury thermometer 356 mounted within the coaxial shield 358 and having a mercury bulb 360 formed therewith. The mercury thermometer and bulb are supported by the support block 372 by means of a plastic retainer 362 and a coil spring 364 which is located between an annular shoulder 366 in support block 372 and an annular flange 368 around thermometer 356 to properly position the bulb 360 in the flow stream of the fluid. A heavy duty spring 370 compressed between the lower flange cap 338 and support block 372 holds the latter firmly against the sensor tube 328 which has sealing gaskets 374 at each of its ends to prevent the fluid from entering into the area within sensor tube 328. As the mercury within thermometer 356 rises and falls in response to fluid temperature changes, the compensator assembly, through its contact 359 with the metallic coating 354, gives the sensor a varying capacitance to automatically compensate for the change in the fluid dielectric constant due to such temperature changes.

The transmitter of the FIGURES 2 and 4 sensor assembly is shown in exploded view in FIGURE 5 of the drawing. Advantageously, the transmitter is mounted within an explosion-proof and weather-proof housing 94. The transmitter circuit is completely transistorized and is thermostatically controlled at a desired temperature, such as 120° F., so that temperature ambients have no effect upon the operation of the transmitter. As shown in FIGURE 5, the transmitter advantageously is mounted on a plug-in printed circuit board 96 which is adapted to be removably plugged into the transmitter base 98. As explained hereinabove, the transmitter base 98 is internally threaded for direct connection to the hub 92 of the upper flange cap 48 of the sensor. It also has been found advantageous to provide a shield 100 around the plug-in printed circuit board of the transmitter circuit to protect the latter and to eliminate any adverse influences upon its operation.

An alternative embodiment of transmitter assembly useful with the alternative sensor arrangement of FIGURE 10 is shown in FIGURES 9 and 11 of the drawing. As disclosed in the assembled view of FIGURE 9 and the exploded view of FIGURE 11, the alternative transmitter embodiment comprises the explosion-and-weather proof housing 398 which encloses the transmitter circuit of the invention. The transmitter circuit advantageously is mounted on a plug-in printed circuit board 396 adapted to be removably plugged into housing 398. Advantageously, a protective shield 300, is provided around the printed circuit board 396 to eliminate adverse influences upon the transmitter operation.

The transmitter housing is adapted to be sealed by the cover 394 which is threadedly fastened in the upper opening of the housing 398 to enclose the transmitter circuit therein. In addition, housing 398 is provided with a small access cap 397 which is removably secured to a side opening of the housing to provide access to a calibration switch 322, for the purpose described in greater detail hereinbelow.

The operation of the transmitter circuit will be explained in connection with the block diagram of FIGURE 6 and the schematic diagram of FIGURE 7. The transmitter circuit comprises a fixed frequency crystal controlled oscillator and a precision variable frequency oscillator. The variable frequency oscillator 102 of the transmitter utilizes the sensor capacitor as the variable capacitor of a series resonant tank circuit. Thus, as shown in FIGURE 6, the sensor capacitor comprises the capacitance plates 54 and 30 of the sensor to determine the frequency of oscillation. The output of the variable frequency oscillator is mixed at the mixer 105 with the output of the fixed frequency oscillator 104 to form a difference or beat frequency which increases as the sensor capacitance increases. This difference frequency at the output of mixer 105, which in one illustrative embodiment of the invention is within a range from 100 to 2,000 cycles, is amplified and converted to a square wave by the square wave circuit 106.

The square wave output of circuit 106 is applied to a passive analog counter 108 to provide a filtered direct current which is actually proportional to the difference or beat frequency output between the oscillators 102 and 104. The filtered direct current from the passive analog counter 108 is applied to an impedance isolation stage 107, which advantageously may be of a "common base transistor type," so that the output current on the output line 110 is independent of line and load resistance over a substantial range, such as from 0 to 30,000 ohms. This output current on the line 110 is applied to a diverter controller for effecting fluid flow diverter functions upon the detection of an excessive amount of B.S. and W. contamination in the crude oil.

The transmitter circuit described hereinabove with respect to the block diagram of FIGURE 6 is shown in greater detail in the illustrative schematic circuit diagram of FIGURE 7. As there shown, the fixed frequency oscillator 104 is comprised of a fixed frequency crystal 112 which is connected in series with the resistance 114 between the power supply output leads 116 and 118. The junction of crystal 112 and resistance 114 is connected to the base of transistor 120, the collector of which is connected to the power supply lead 116. The capacitors 122 and 124 are connected in series between the transistor base and the power supply lead 118, with the junction of the capacitors being connected to the transistor emitter through the resistance 126. The primary winding of transformer 136 is connected in parallel with capacitor 124.

The fixed frequency controlled oscillator 104 is adapted to oscillate at a suitable fixed frequency, as for example, 100 kc. Operating power for the circuit is obtained from a power supply which is energized from the 115 volt A.C. lines 128 and 130 through the power transformer 132. The secondary winding of transformer 132 is connected to the power supply lead 119 and through the diode 134 and the current limiting resistance 142 to the D.C. power supply lead 116. A filter capacitor 140 is connected from the junction of diode 134 and resistance 142 to power supply lead 118. A Zener diode 144 and capacitor 146 are connected in parallel between the D.C. power supply leads 116 and 118.

The D.C. power supply leads 116 and 118 are connected, as indicated by the reference X and Y to the remainder of the transmitter circuit which comprises a variable frequency oscillator, a mixer, a square wave generator, a passive analog counter network, and an impedance isolation output stage. The variable frequency oscillator comprises the transistor 152 having its collector connected to power supply lead 116 and its emitter connected, as indicated by the references X and Y to the re- 118. The hot capacitor plate 54 of the sensor is connected through terminal 6 of terminal strip 156 and lead 157 to the inductance coil 158 of the variable frequency oscillator.

Figure 7:
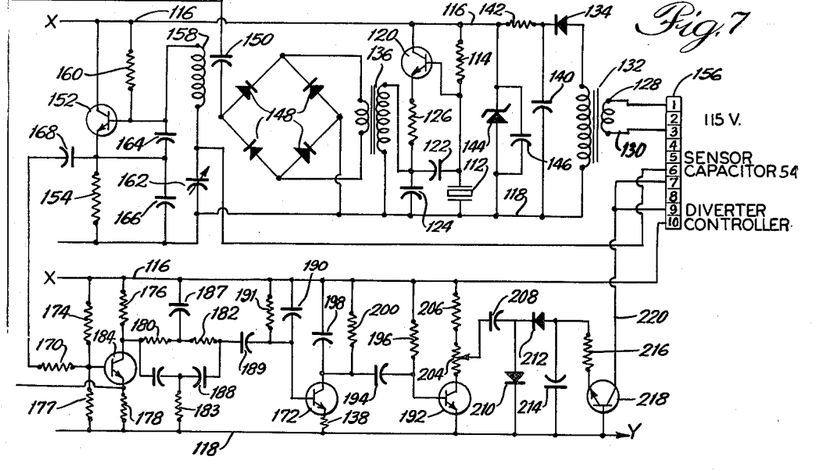
FIGURE 7 is a schematic diagram of the transmitter circuit.

As shown in FIGURE 7, the sensor capacitor and the inductance coil 158 are connected in a series resonant tank circuit, such that the frequency of oscillation is determined by the capacitance of the sensor in the manner explained hereinabove. A resistor 160 is connected between coil 158 and power supply lead 116, while a zero adjust variable condenser 162 is connected between inductance coil 158 and power supply lead 118. When the dielectric constant of the fluid varies, the capacitance of the sensor will change causing a shift in the zero. Variations of crude oil are common and may require slight readjustment of the zero in the operation of the invention.

A pair of capacitors 164 and 166 are connected in series between the transistor base and power supply lead 118 with the capacitor 166 being connected in parallel with the emitter resistor 154.

The output of the variable frequency oscillator 102 is applied through a coupling network comprising the capacitor 168 and resistor 170 to the base of a mixer transistor 184. Resistors 174 and 176 are connected respectively from the transistor base and collector to the power supply lead 116 while resistor 178 is connected from the transistor emitter to the power supply lead 118. Resistor 177 is connected from the mixer transistor base to the power supply lead 118.

The output of the fixed frequency oscillator 104 is coupled through transformer 136 to the full wave diode bridge 148. The output of bridge 148 is connected through capacitor 150 in parallel with resistor 178 in the emitter circuit of mixer transistor 184. The output from the collector of mixer transistor 184 is coupled through the filter network comprising capacitors 186, 187 and 188 and resistors 180, 182, and 183, and through coupling capacitor 189, to the base of an amplifier transistor 172. The base of transistor 172 also is connected through the parallel combination of capacitor 190 and resistor 191 to the power supply lead 116. The emitter of transistor 172 is connected through resistor 138 to power supply lead 118. The collector is returned to power supply lead 116 through the parallel combination of capacitor 198 and resistor 200, and is coupled to the base of transistor 192 through capacitor 194. The resistor 196 connects the base of transistor 192 to the power supply lead 116.

In the operation of the transmitter circuit, the transistor 192 serves as an on-off switch to provide a square wave output from the signal derived as the beat frequency signal of the fixed and variable frequency oscillators. Thus, the variable frequency oscillator output is applied to the base of transistor 184, and the fixed frequency oscillator output is applied to the emitter of transistor 184. Those skilled in the art will appreciate that the two output signals from the oscillators are mixed in the transistor 184 to produce an output signal which is the difference or beat frequency between the two oscillator signals.

This difference or beat frequency, in the form of a sine wave, in the range of approximately 100 to 2,000 cycles, is amplified by transistor 172 and converted into a square wave by the operation of transistor 192. The emitter of transistor 192 is connected to the lead 118 of the power supply and the collector of transistor 192 is returned through the potentiometer 204 and resistor 206 to the power supply lead 116. Thus, in the operation of the transistor 192, the latter saturates at each positive one-half wave of the beat frequency signal to produce a square wave output in a manner well-known to those skilled in the art.

This square wave output is taken from the potentiometer 204, which serves as a span adjustment, and is applied to a passive analog counter formed of the capacitor 208, the diodes 210 and 212, and the capacitor 214. This passive analog counter network counts the square waves at the output of transistor 192 to provide a D.C. current signal at the resistor 216 and emitter electrode of transistor 218 which is proportional to the difference or beat frequency. The transistor 218 has its base returned to the D.C. supply lead 118, and its collector connected to the output lead 220 adapted to be connected to the diverter controller. In the operation of the invention, the transistor 218 serves as an impedance isolator in properly matching the output of the transmitter to the diverter controller or other load.

The span adjustment potentiometer 204 changes the amount of transmitter output (as for example, from 0.1 to 1.0 ma.) in relationship to the percent of water in the crude oil. The span adjustment advantageously may be factory set and should seldom require field adjustment.

In accordance with a further feature of this invention, a calibrating network is permanently attached to the inside of the transmitter housing and is accessible from the outside of the housing—either directly as in the FIGURE 5 embodiment or through a small access cap 397 as in the FIGURE 11 embodiment—so that calibration can be checked without removing the main transmitter housing or cover. The base 98 of the FIGURE 5 embodiment and the housing 398 of the FIGURE 11 embodiment are shown as supporting the elements comprising the calibrating network. The adjustment for the calibrating network is effected by lever 222 of FIGURE 2 or switch 322 of FIGURE 11 so that the calibration of the transmitter can be checked in a simple and ready manner. Advantageously, the calibration network is adjustable to three different positions by the lever 222 or switch 322, which positions may correspond to "Operate," "¼% B.S. & W.," and "1¾% B.S. & W." The latter two positions are for test purposes and can be used to check instrument drift. They simulate the sensor capacitance and therefore, are completely independent of the sensor itself.

The operation of the diverter controller will now be described. As explained hereinabove, the output of the transmitter is a D.C. current signal having an amplitude corresponding to the B.S. and W. content detected in the fluid flow by the sensor.

One illustrative embodiment of diverter controller which may be utilized in the invention is shown in an external view in FIGURE 3. It can there be seen that the diverter controller 18 may comprise a chart recorder for making permanent record of the B.S. and W. fluid flow analysis upon a strip chart 224 which is centrally located in the diverter controller housing. Those skilled in the art will appreciate that the recorder cover 226 may be released by the knob 228 to permit the cover 226 to be rotated forwardly on the hinges 230 for replacing the strip chart and for further maintenance and repair operations.

In addition, the diverter controller assembly 18 may comprise four long-life indicator lights on its front panel to indicate the various operating functions. Thus, the light 232 may be a clear light to indicate that power is on in the instrument. The light 236 may be a white light to indicate that clean oil is being processed in the fluid flow system. The light 238 may be an amber light to indicate that excess B.S. and W. has been detected in the fluid, and the light 240 may be a red light to indicate that oil is being diverted when the preset time delay has been exceeded and excess B.S. and W. is present.

In addition, the diverter controller panel may comprise a manually operable B.S. and W. adjustment control 242 and an external test current adjustment control 244 with a test current calibrate switch 245. A power switch 246 also may be provided on the diverter controller panel.

Figure 8:
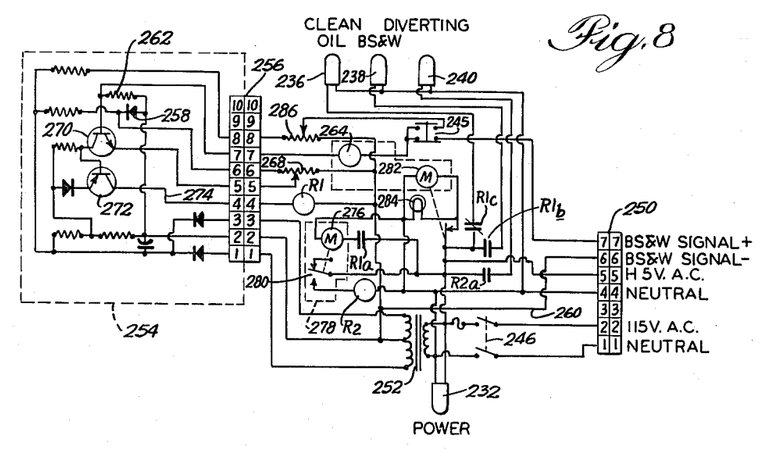
FIGURE 8 is a schematic diagram of the diverter controller circuit in accordance with the invention.

The wiring circuit of the diverter controller is shown in FIGURE 8 of the drawing. Terminals 1 and 2 of terminal connector 250 supply 115 volts A.C. to the diverter controller circuit as well as to the terminals 4 and 5 of the terminal connector for powering the sensor transmitter. The B.S. and W. signals from the transmitter are brought into the diverter calibrator at terminals 6 and 7 of terminal connector 250. The terminals 1 and 2 of terminal connector 250 are connected through the on-off switch 246 and suitable fuses to the power transformer 252. The power indicator light 232 is connected directly across the primary of power transformer 252.

In accordance with a feature of this invention, the diverter controller comprises two functional sections, namely, an adjustment for tripping a relay for excess B.S. and W. between predetermined limits, such as 0 to 2%; and a time delay circuit variable for a preset period, such as between 0 and 5 minutes, for actuating a load or the diverting relay.

The diverting relay control circuit advantageously may be mounted on a printed circuit board 254 which is connected to the remainder of the diverter controller circuit by the terminal strip 256. The tripping point for the relay is obtained by comparing the voltage developed by the transmitter output current signal across a precision resistor 262 with a preset voltage from a Zener reference diode 258. One side of precision resistor 262 is connected through the terminals 2 of terminal strip 256 to the lead 260 which is connected to the B.S. and W. signal terminal 6 of terminal connector 250. The other side of resistor 262 is connected through terminals 7 of terminal strip 256, the recorder meter 264 and the normally closed momentary contact test current switch 245 to the remaining B.S. and W. signal terminal 7 of terminal connector 250. The Zener diode 258 is connected at one side of the precision resistor 262 and at its other side, through the terminals 6 of terminal strip 256 and the B.S. and W. adjustment potentiometer 268, to the B.S. and W. lead 260.

When the voltage across the precision resistor 262 slightly exceeds the preset voltage across the Zener reference diode 258, the difference signal is amplified by a two stage high gain D.C. amplifier comprising the transistors 270 and 272. The output of the two stage amplifier at lead 274 is applied through the terminal 4 of terminal strip 256 to energize the trip relay R1. The contacts R1a and R1b of relay R1 are normally open while the contacts R1c of relay R1 are normally closed, as shown in FIGURE 8 of the drawing. If desired, additional contacts (not shown) may be provided for external control functions which do not require time delay.

When the normally open set of contacts R1a are closed by the energizing of relay R1, the A.C. supply line at terminals 1 and 2 of terminal connector 250 is connected to a synchronous motor drive 276 of a settable time delay timer 278. When the time delay contacts 280 are closed by the motor drive 276 after the desired predetermined time delay interval, the diverting relay R2 is energized by being connected directly across the A.C. power source. The energizing of diverting relay R2 closes its normally open contacts R2a to energize the diverting indicator light 240.

In addition, it also will be seen that the recorder chart drive motor 282 and the chart drive indicator light 284 will be energized directly from the power source when the power switch 246 is closed.

After the B.S. and W. content has dropped below the trip point as determined by the B.S. and W. adjustment potentiometer 268, the tripping relay R1 de-energizes to disconnect power from the time delay 278, this function being effected by the opening of the relay contacts R1a. Advantageously, a spring return may be provided to reset the time delay so that the diverter instrument is again ready for operation.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of fluid flow monitoring apparatus comprising, in combination, a sensor for measuring the dielectric constant of the fluid to detect changes in the dielectric constant resulting from contamination of the fluid, said sensor comprising a metallic pipe forming an outer capacitor plate of a dielectric constant measuring circuit, a ceramic tube positioned within said pipe and spaced therefrom to define an annular fluid flow conduit therebetween, said conduit being free of obstructions to fluid flow to minimize build-up of foreign material or the adverse effect of varying flow velocities, metallic means within said ceramic tube forming an inner capacitor plate of the dielectric constant measuring circuit, temperature compensation means within said ceramic tube comprising a column of mercury having a height dependent upon the temperature of the fluid for varying the capacitance of the sensor to compensate for changes in the dielectric constant of the fluid due to temperature variations in the fluid, a transmitter positioned within an explosion-proof and weather-proof housing supported on said pipe, said transmitter comprising a variable frequency oscillator connected to the sensor capacitor plates such that the frequency of said oscillator is determined by the dielectric constant of the fluid flowing through said sensor, a fixed frequency oscillator, signal mixing means connected to the variable and fixed frequency oscillators for mixing their outputs to provide a beat frequency, counting means connected to the output of said signal mixing means and responsive to said beat frequency to provide a D.C. control signal having an amplitude proportional to said beat frequency, and a diverter controller connected to receive said D.C. control signal for effecting a fluid diversion function when the amplitude of said D.C. control signal exceeds a predetermined value to indicate the detection of an excessive change in the dielectric constant of the fluid being monitored.

2. The improvement of fluid flow monitoring apparatus comprising, in combination, a sensor for measuring the dielectric constant of the fluid to detect changes in the dielectric constant resulting from contamination of the fluid, said sensor comprising a metallic pipe forming an outer capacitor plate of a dielectric constant measuring circuit, a ceramic tube positioned with in said pipe and spaced therefrom to define an annular fluid flow conduit therebetween, said conduit being free of obstructions to fluid flow to minimize build-up of foreign material or the adverse effect of varying flow velocities, metallic means within said ceramic tube forming an inner capacitor plate of the dielectric constant measuring circuit, a transmitter comprising a variable frequency oscillator connected to the sensor capacitor plates such that the frequency of said oscillator is determined by the dielectric constant of the fluid flowing through said sensor, a fixed frequency oscillator, signal mixing means connected to the variable and fixed frequency oscillators for mixing their outputs to provide a beat frequency, counting means connected to the output of said signal mixing means and responsive to said beat frequency to provide a D.C. control signal having an amplitude proportional to said beat frequency, and a diverter controller connected to receive said D.C. control signal for effecting a fluid diversion function when the amplitude of said D.C. control signal exceeds a predetermined value to indicate the detection of an excessive change in the dielectric constant of the fluid being monitored.

3. The improvement of fluid flow monitoring apparatus comprising, in combination, a sensor for measuring the dielectric constant of the fluid to detect changes in the dielectric constant resulting from contamination of the fluid, said sensor comprising a metallic pipe forming an outer capacitor plate of a dielectric constant measuring circuit, a non-metallic tube positioned within said pipe and spaced therefrom to define an annular fluid flow conduit therebetween, metallic means within said non-metallic tube forming an inner capacitor plate of the dielectric constant measuring circuit, a transmitter comprising a variable frequency oscillator connected to the sensor capacitor plates such that the frequency of said oscillator is determined by the dielectric constant of the fluid flowing through said sensor, a fixed frequency oscillator, signal mixing means connected to the variable and fixed frequency oscillators for mixing their outputs to provide a beat frequency, counting means connected to the output of said signal mixing means and responsive to said beat frequency to provide a amplitude proportional to said beat frequency, and a diverter controller connected to receive said D.C. control signal for effecting a fluid diversion function when the amplitude of said D.C. control signal exceeds a predetermined value to indicate the detection of an excessive change in the dielectric constant of the fluid being monitored.

4. The improvement of fluid flow monitoring apparatus comprising a sensor for measuring the dielectric constant of the fluid to detect changes in the dielectric constant resulting from contamination of the fluid, said sensor comprising a metallic pipe forming an outer capacitor plate of a dielectric constant measuring circuit, a ceramic tube positioned within said pipe and spaced therefrom to define an annular fluid flow conduit therebetween, said conduit being free of obstructions to fluid flow to minimize buildup of foreign materials or the adverse effect of varying flow velocities, a metallic coating within said ceramic tube forming an inner capacitor plate of the dielectric constant measuring circuit, temperature compensation means within said ceramic tube comprising a column of mercury having a height dependent upon the temperature of the fluid for varying the capacitance of the sensor to compensate for changes in the dielectric constant of the fluid due to temperature variations in the fluid, and a transmitter positioned within an explosion-proof and weather-proof housing supported on said pipe, said transmitter comprising a variable frequency oscillator connected to the sensor capacitor plates such that the frequency of said oscillator is determined by the dielectric constant of the fluid flowing through said sensor, a fixed frequency oscillator, signal mixing means connected to the variable and fixed frequency oscillators for mixing their outputs to provide a beat frequency, and counting means connected to the output of said signal mixing means and responsive to said beat frequency to provide a D.C. control signal having an amplitude proportional to said beat frequency.

5. The improvement of fluid flow monitoring apparatus comprising a sensor for measuring the dielectric constant of the fluid to detect changes in the dielectric constant resulting from contamination of the fluid, said sensor comprising a metallic pipe forming an outer capacitor plate of a dielectric constant measuring circuit, a non-metallic tube positioned within said pipe and spaced therefrom to define an annular fluid flow conduit therebetween, said conduit being free of obstructions to fluid flow to minimize build-up of foreign materials or the adverse effect of varying flow velocities, metallic means within said non-metallic tube forming an inner capacitor plate of the dielectric constant measuring circuit, and a transmitter positioned within an explosion-proof and weather-proof housing supported on said pipe, said transmitter comprising a variable frequency oscillator connected to the sensor capacitor plates such that the frequency of said oscillator is determined by the dielectric constant of the fluid flowing through said sensor, a fixed frequency oscillator, signal mixing means connected to the variable and fixed frequency oscillators for mixing their outputs to provide a beat frequency, and counting means connected to the output of said signal mixing means and responsive to said beat frequency to provide a D.C. control signal having an amplitude proportional to said beat frequency.

6. The improvement of fluid flow monitoring apparatus comprising a sensor including capacitor plates for measuring the dielectric constant of the fluid to detect changes in the dielectric constant resulting from contamination of the fluid, a transmitter comprising a variable frequency oscillator connected to the sensor capacitor plates such that the frequency of said oscillator is determined by the dielectric constant of the fluid flowing through said sensor, a fixed frequency oscillator, signal mixing means connected to the variable and fixed frequency oscillators for mixing their outputs to provide a beat frequency, counting means connected to the output of said signal mixing means and responsive to said beat frequency to provide a D.C. control signal having an amplitude proportional to said beat frequency, and a diverter controller connected to receive said D.C. control signal for effecting a fluid diversion function when the amplitude of said D.C. control signal exceeds a predetermined value to indicate the detection of an excessive change in the dielectric constant of the fluid being monitored.

7. The improvement of fluid flow monitoring apparatus comprising a sensor including capacitance plates for measusing the dielectric constant of the fluid to detect changes in the dielectric constant resulting from contamination of the fluid, a transmitter comprising a variable frequency oscillator connected to the sensor capacitor plates such that the frequency of said oscillator is determined by the dielectric constant of the fluid flowing through said sensor, a fixed frequency oscillator, signal mixing means connected to the variable and fixed frequency oscillators for mixing their outputs to provide a beat frequency, counting means connected to the output of said signal mixing means and responsive to said beat frequency to provide a D.C. control signal having an amplitude proportional to said beat frequency, and a diverter controller connected to receive said D.C. control signal for effecting a fluid diversion function when the amplitude of said D.C. control signal exceeds a predetermined value to indicate the detection of an excessive change in the dielectric constant of the fluid being monitored, said diverter controller comprising selectively settable delay means for delaying the fluid diversion function a selectable time period after the D.C. control signal exceeds said predetermined value.

References Cited by the Examiner
UNITED STATES PATENTS

| | | | |
|---|---|---|---|
| 2,422,742 | 6/47 | Odessey | 324—61 |
| 2,607,830 | 8/52 | Razek | 324—61 |
| 2,654,067 | 9/53 | Bruce | 324—61 |
| 2,759,134 | 8/56 | Sullivan | 317—246 |
| 2,773,556 | 12/56 | Meyers et al. | 183—2.7 |
| 2,783,420 | 2/57 | Thompson et al. | 317—246 |
| 2,924,756 | 2/60 | Tolin | 317—146 |
| 3,005,554 | 10/61 | Kuntz | 210—195 X |
| 3,012,193 | 12/61 | Breen | 324—61 |
| 3,043,993 | 7/62 | Maltby | 317—146 |

SAMUEL BERNSTEIN, *Primary Examiner.*
LLOYD McCULLOM, *Examiner.*